(12) United States Patent
Nielsen

(10) Patent No.: US 8,397,947 B2
(45) Date of Patent: Mar. 19, 2013

(54) APPARATUS AND A METHOD AND A SYSTEM FOR DISPENSING GOODS

(75) Inventor: Ole Cramer Nielsen, Silkeborg (DK)

(73) Assignee: House of Prince A/S, Soborg (DK)

( * ) Notice: Subject to any disclaimer, the term of this patent is extended or adjusted under 35 U.S.C. 154(b) by 564 days.

(21) Appl. No.: 12/279,711

(22) PCT Filed: Jan. 18, 2007

(86) PCT No.: PCT/DK2007/000023
§ 371 (c)(1),
(2), (4) Date: Mar. 16, 2009

(87) PCT Pub. No.: WO2007/082537
PCT Pub. Date: Jul. 26, 2007

(65) Prior Publication Data
US 2009/0210088 A1    Aug. 20, 2009

(30) Foreign Application Priority Data
Jan. 20, 2006 (DK) .................... 2006 00088

(51) Int. Cl.
*B65H 1/00* (2006.01)
(52) U.S. Cl. ......... 221/133; 221/130; 221/192; 221/270
(58) Field of Classification Search ............... 221/130, 221/133, 192, 278, 126; 248/220.31, 224.8, 248/225.21; 211/184, 189; 312/348.3
See application file for complete search history.

(56) References Cited

U.S. PATENT DOCUMENTS

| | | | | |
|---|---|---|---|---|
| 4,483,459 A | * | 11/1984 | Taylor et al. | 221/130 |
| 4,717,044 A | * | 1/1988 | Suzuki et al. | 221/130 |
| 5,096,090 A | * | 3/1992 | Schwartz et al. | 221/130 |

(Continued)

FOREIGN PATENT DOCUMENTS

| | | |
|---|---|---|
| DE | 19909783 A1 | 4/1999 |
| EP | 0670132 A1 | 9/1995 |

(Continued)

OTHER PUBLICATIONS

International Search Report corresponding to PCT/DK2007/000023 mailed Apr. 27, 2007.

*Primary Examiner* — Timothy Waggoner
(74) *Attorney, Agent, or Firm* — Cooley LLP

(57) ABSTRACT

The invention relates to a dispenser apparatus for goods, said apparatus comprising a storage unit (1) for storing goods in a number of storage passages (7), a unit (8) for conveying one or more goods from the storage unit (1) to a conveyor unit (2, 20), said conveyor unit (2, 20) conveying, via an air pressure, goods to a dispensing station, wherein the storage passages (7) of the storage unit (1) forms an angle to the horizontal which is larger than or smaller than 90°, and wherein the unit (8) in the form of a fetcher mechanism comprises one or more ejectors for pushing one or more goods conveyed into one or more transfer chambers (19) into a conveyor pipe (2). The invention also comprises a method of dispensing goods, wherein the method comprises receipt of data representing selection of at least one item (202); and dispensing from a dispenser apparatus of said at least one item, if said at least one item is in stock in said apparatus for dispensing, and if said dispenser apparatus has received data representing a recording of said at least one item and/or recording of a payment made in respect of said at least one item (203).

16 Claims, 12 Drawing Sheets

U.S. PATENT DOCUMENTS

| | | | |
|---|---|---|---|
| 5,725,124 A * | 3/1998 | Bustos et al. | 221/211 |
| 6,044,989 A * | 4/2000 | Sosso | 211/189 |
| 6,340,095 B1 * | 1/2002 | Walter | 221/130 |
| 6,502,718 B2 * | 1/2003 | Fitzgerald et al. | 221/131 |
| 6,513,678 B2 * | 2/2003 | Yasaka et al. | 221/133 |
| 6,682,289 B1 * | 1/2004 | Credle, Jr. | 221/133 |
| 7,681,746 B2 * | 3/2010 | Schmidt | 211/184 |

FOREIGN PATENT DOCUMENTS

| | | |
|---|---|---|
| EP | 0786748 A | 7/1997 |
| EP | 0892374 A1 | 1/1999 |
| EP | 0949168 A1 | 10/1999 |

* cited by examiner

APPARATUS AND A METHOD AND A SYSTEM FOR DISPENSING GOODS

CLAIM FOR PRIORITY

This application is a National Stage Entry entitled to and hereby claims priority under 35 U.S.C. §§365 and 371 corresponding to PCT Application No. PCT/DK2007/000023, titled. "AN APPARATUS AND A METHOD AND A SYSTEM FOR DISPENSING GOODS," filed Jan. 18, 2007, which in turn claimed priority to Denmark Application No. PA 2006 00088, filed Jan. 20, 2006; all of which is hereby incorporated by reference.

The invention relates to a dispenser apparatus for goods, which apparatus comprises a storage container for storing goods in a number of storage passages, which storage passages form an angle relative to the horizontal which is larger or smaller than 90°, a unit for conveying one or more goods from the storage container to a conveyor unit, which conveyor unit conveys goods to a dispensing station via an air pressure.

The invention also relates to a method of dispensing goods, wherein said method comprises:
  receipt of data representing selection of at least one item; and
  dispensing from a dispenser apparatus in accordance with the invention said at least one item, if said at least one item is available from said apparatus for dispensing; and if said dispenser apparatus has received data representing a recording of said at least one item and/or recording of a payment made in respect of said at least one item.

Moreover the invention relates to a system for dispensing goods, wherein the system comprises
  a dispenser apparatus in accordance with the invention; and
  at least one payment unit;
wherein said dispenser apparatus and said at least one payment unit are connected to exchange data representing selection of at least one item and data representing a recording of said at least one item and/or recording of a payment made in respect of said at least one item.

It is known in the context of tobacco, in particular cigarette packets, to store the packets in a storage located in the back of the shop or in premises other than the shop. From here cigarette packets can be conveyed to one or more dispensing outlets that are, in most cases, situated at a check-out point. EP 0 700 025 B teaches a sales dispenser where it is possible to select an item from a storage and to convey it to a specific site.

Here, the conveyance of packets of cigarettes takes place by means of air, and the packets are taken from a central storage for being dispensed at a check-out point when the customer or the shop assistant has selected the item, eg by pressing a button.

Here, the storage space is constructed such that the packets of cigarettes are stacked in a vertical stack to the effect that the packets rest on top of each other on their mutually largest faces. This means that the packets sit on top of each other with the front of the first packet resting against the rear of the next packet, and so on.

This means that there is an increased risk that the lowermost packets are deformed due to the superposed packets and that more force is needed for removing the lowermost packet from the stack; the weight from the remaining packets contributing to increasing the friction on the lowermost package.

EP 0 991 036 A2 teaches a sales dispenser, wherein it is possible to select an item from a storage and to convey it to a specific site, here in the form of an delivery outlet, where a shop assistant may take the item. That sales dispenser is configured with storage passages that form an inclined angle to the horizontal. The sales dispenser is provided with a unit for conveying an item from the storage unit to a delivery drawer or shelf. The unit is provided with release means in the form of two mutually fixated and parallel release fingers intended for lifting an item across a stop edge on the storage passage. The release fingers are configured in this manner since comparatively large packages with goods are concerned. The distance between the two fingers is therefore essential in order for a package not to tilt to either side during the manoeuvring from the storage passage to the delivery drawer or shelf.

Novel Technique

To solve the above-mentioned problems, a storage unit is provided which, via a fetcher mechanism, is connected to one or more conveyors for conveyance of goods, preferably cigarette packets or other goods that represent a comparatively high value and take up so little space that they can be tucked away in a pocket or the like. Examples of other categories of goods include razor blades as they represent quite a high sales value today and, at the same time, they do not take up much space. This storage unit comprises a cabinet or a closet with a gate. When the gate is opened, access is provided to the cabinet interior where a carriage is arranged. The carriage can be removed from the storage unit and be replaced by another carriage which is replenished with goods. It is also an option to replenish the carriage with goods on site.

It is an advantage of this type of storage unit that it can be replenished in a central storage elsewhere in town, or in the country for that matter, and be taken by train, car or other suitable means of conveyance to the sales outlet, where the goods are to be sold. Then the carriage is arranged in the storage unit, and the storage unit is locked, following which it is possible to remove goods only through conveyor pipes that lead to a payment service that ensures that only those goods are delivered that are recorded and/or paid for. The only other option is to unlock the cabinet to remove goods.

In this manner the risks of loss and robbery/theft are reduced considerably.

According to the invention this is accomplished in that a fetcher mechanism comprises one or more ejectors for pushing one or more items that are conveyed into one or more transfer chambers into a conveyor pipe.

Hereby it is avoided ia that individuals have to take the item and pass it on prior to a customer receiving the item.

The apparatus according to the invention is also able to handle more than one packet or item at a time, which is not possible with the fetcher mechanism shown in EP 0 991 036 A2.

The carriage which is arranged in the storage unit comprises a kind of storage facility which is made of a number of plates and a number of spacer elements that are combined in such a manner that they form a number of passages, storage passages, for storing the goods that are to be handed out upon selling.

The plates are provided with a number of slots, in which slots pins or protrusions can be arranged that protrude from the spacer elements. Thereby it is possible to construct a flexible storage container, it being possible to build such container to contain a desired number of passages for accommodating goods on condition that there is enough space in the unit for accommodating such number of passages. Optionally, a larger unit can be made to accommodate the passages, if necessary.

Plates and spacer elements can also be arranged in a specific manner by the supplier of the storage container.

The passages are formed in that a number of plates are arranged essentially in parallel relative to each other, and wherein the mutual distance between two plates is determined by one or more spacer elements. The spacer elements are also arranged at a mutual distance across the plates to the effect that the mutual distance of the spacer elements determine the width of the passages, and the distance between the plates determine the height of the passages. The length of the passages is determined essentially by the length of the plates.

The dimensions of the individual passages are thus determined by the width of the spacer elements and by the distance between the individual spacer elements. Since the spacer elements are arranged on and secured relative to the plate by arrangement of a number of pins protruding from the spacer elements in a number of slots located in a row on the plate, it is possible that each plate is provided with a number of rows of slots, which rows have a suitable mutual spacing that corresponds to a module of a typical width or thickness of a packaged item. Thereby the number and dimensions of the passages can be adapted in accordance with the wishes of the individual shop.

The width of the plates determines how many passages can be situated next to each other, depending on the width of the individual passages.

The plates are arranged such that the passages extend at an angle to the horizontal and are dimensioned to receive packaged goods. The angle relative to the horizontal are selected to be different from 90° in order to avoid that the lowermost item accommodated in a passage takes up the weight from the remainder of the goods located in the passage.

By the angle assuming a value different from 90°, it is accomplished that a part of the weight of the goods is taken up by the plates. In the following packaged goods are referred to merely as goods.

Thus, due to the inclining plates the goods will not affect each other by the same amount of force as would be the case if the goods were situated on top of each other.

By further dimensioning the passages such that the goods are caused to be situated in extension of each other to the effect that the contact between two items that rest against each other is between the narrow sides of the goods and preferably the ends of the goods, it is accomplished that the compression of an item (most comprehensive for the item situated at the bottom of the stack) is reduced considerably, while simultaneously the impact on the ends of the goods is not to the same extent able to deform the contents of the goods, which is fairly essential in case of tobacco such as cigarettes and the like.

By modifying the dimensions of plates and spacer elements, respectively, it is possible to modify the dimensions of the passages for either all the passages or, by arranging eg the spacer elements with differing spacings, a group of passages can be obtained, where the passages exhibit different cross-sections/clearances. Thereby it is possible to construct a storage container or storage for storing and dispensing goods of different dimensions in a convenient and flexible manner.

From the storage passages one or more goods are fetched in that a fetcher mechanism moved into immediate vicinity of the lower end of the passages is positioned to fetch the desired item(s), a release finger or pin from the fetcher mechanism via a recess or a groove lifts an item across an edge that forms a stop for the goods thereby preventing them from falling out when arranged in the storage passages. Then the item of goods is conveyed across the stop edge and down into a storage container or transfer chamber in the fetcher mechanism. The fetcher mechanism is then caused to assume a delivery position at a delivery unit, which delivery unit comprises one or more blowers and one or more conveyor pipes.

In the following, reference is made to the drawings, wherein

Figure 1:
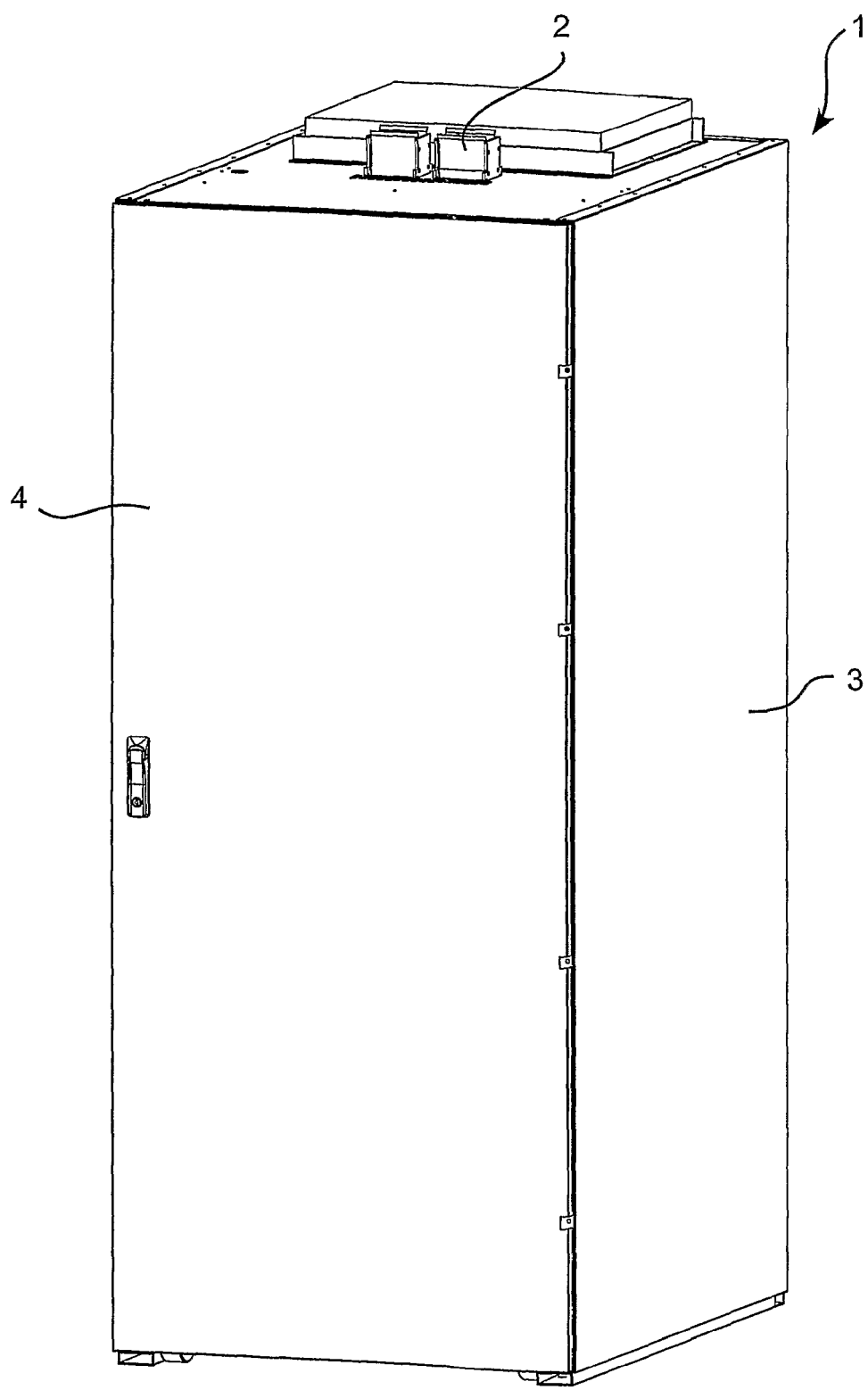
FIG. 1 shows a storage unit in closed state.
Figure 2:
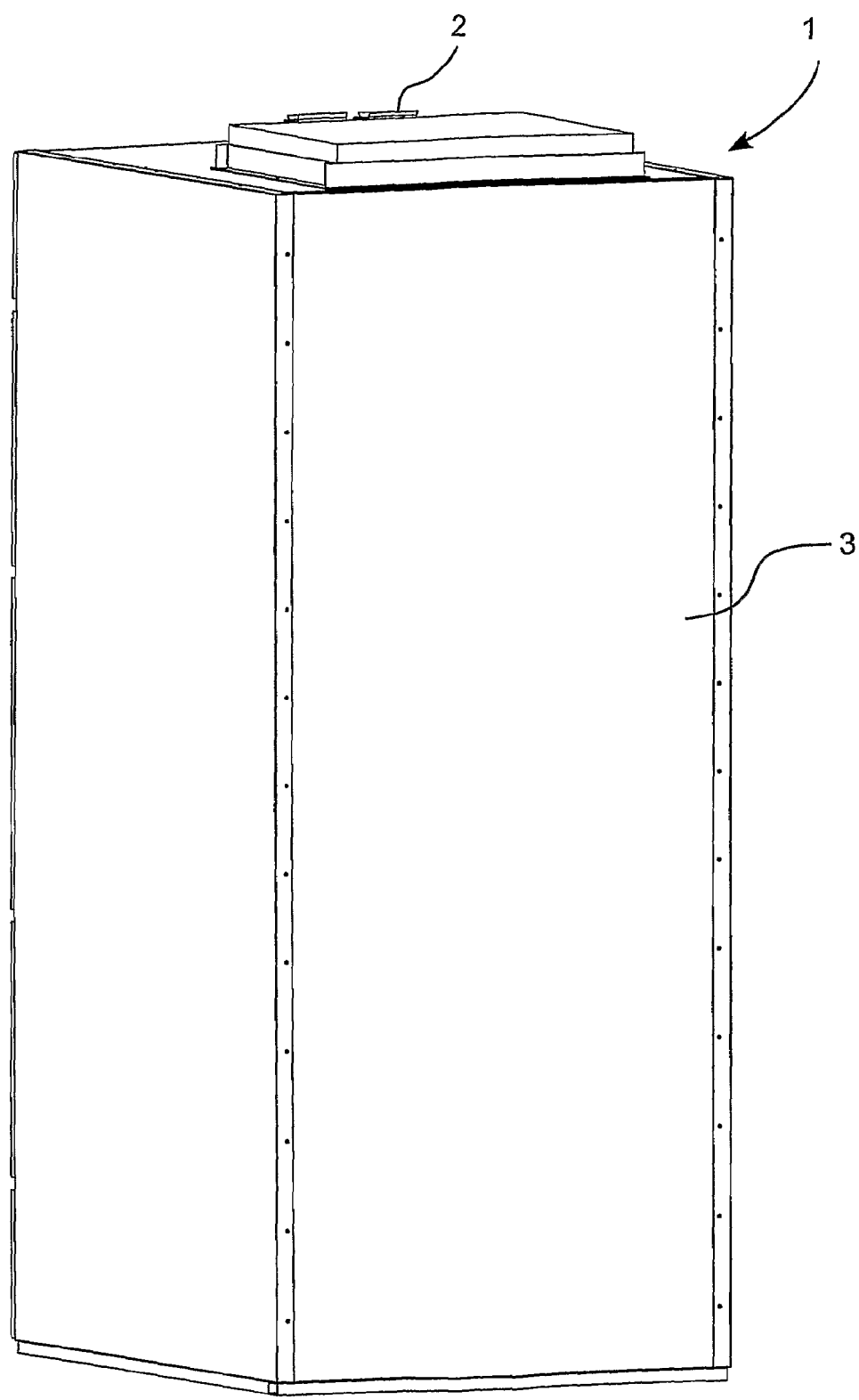
FIG. 2 shows the storage unit shown in FIG. 1, seen in an inclined view from the rear.
Figure 3:
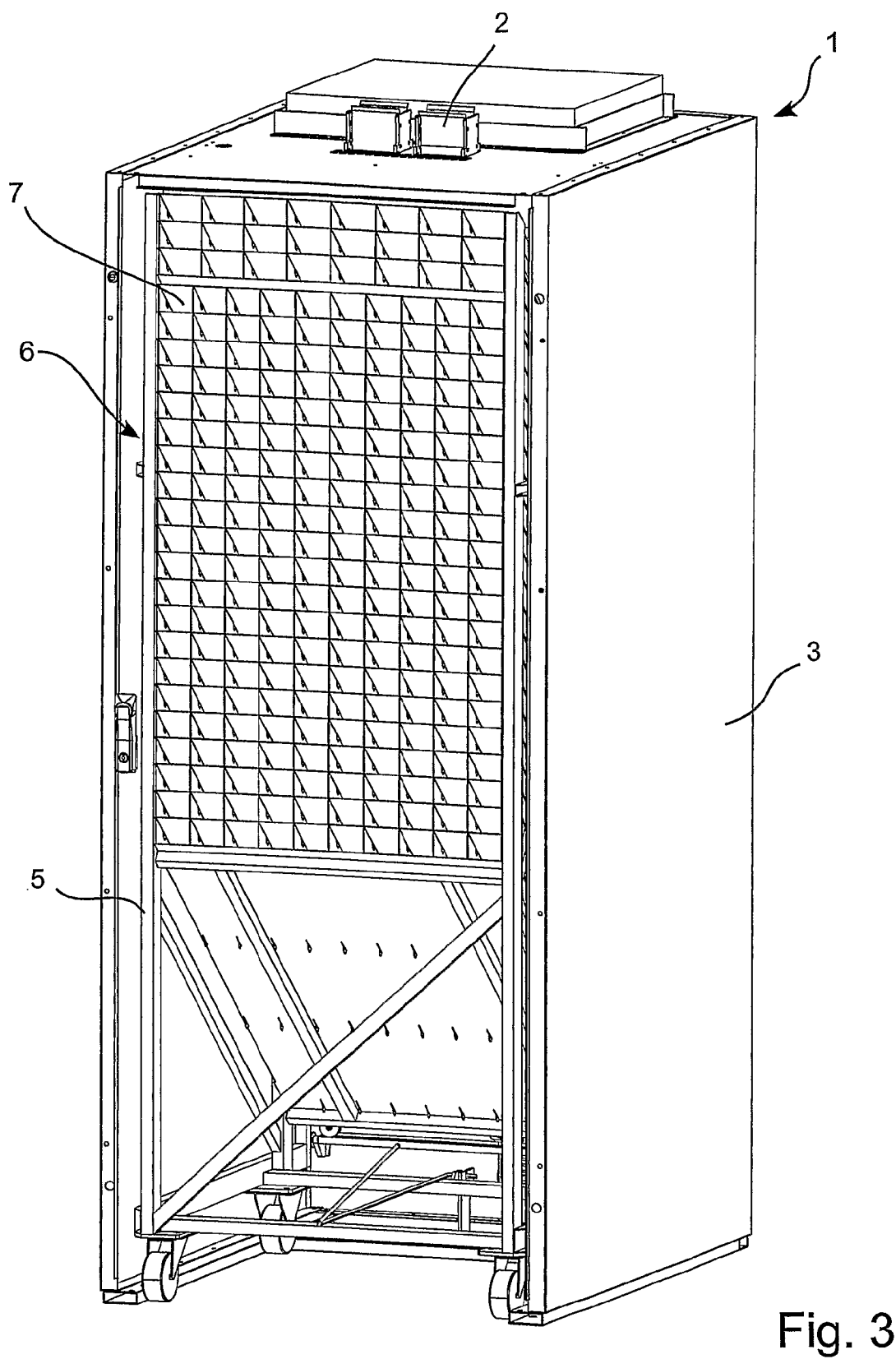
FIG. 3 shows the storage unit shown in FIG. 1 with dismounted gate.
Figure 4:
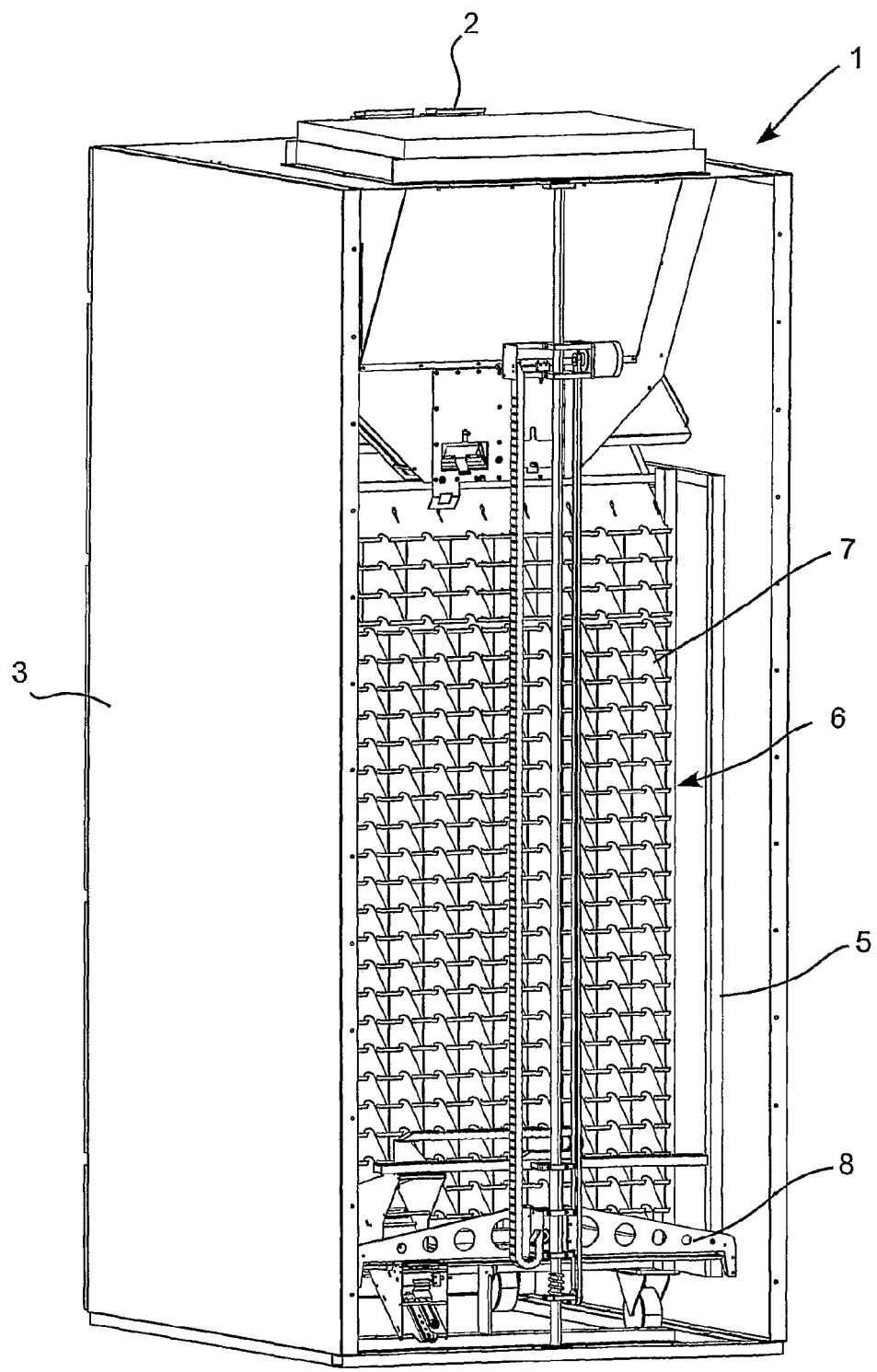
FIG. 4 shows the storage unit shown in FIG. 2 with dismounted cover plate.
Figure 5:
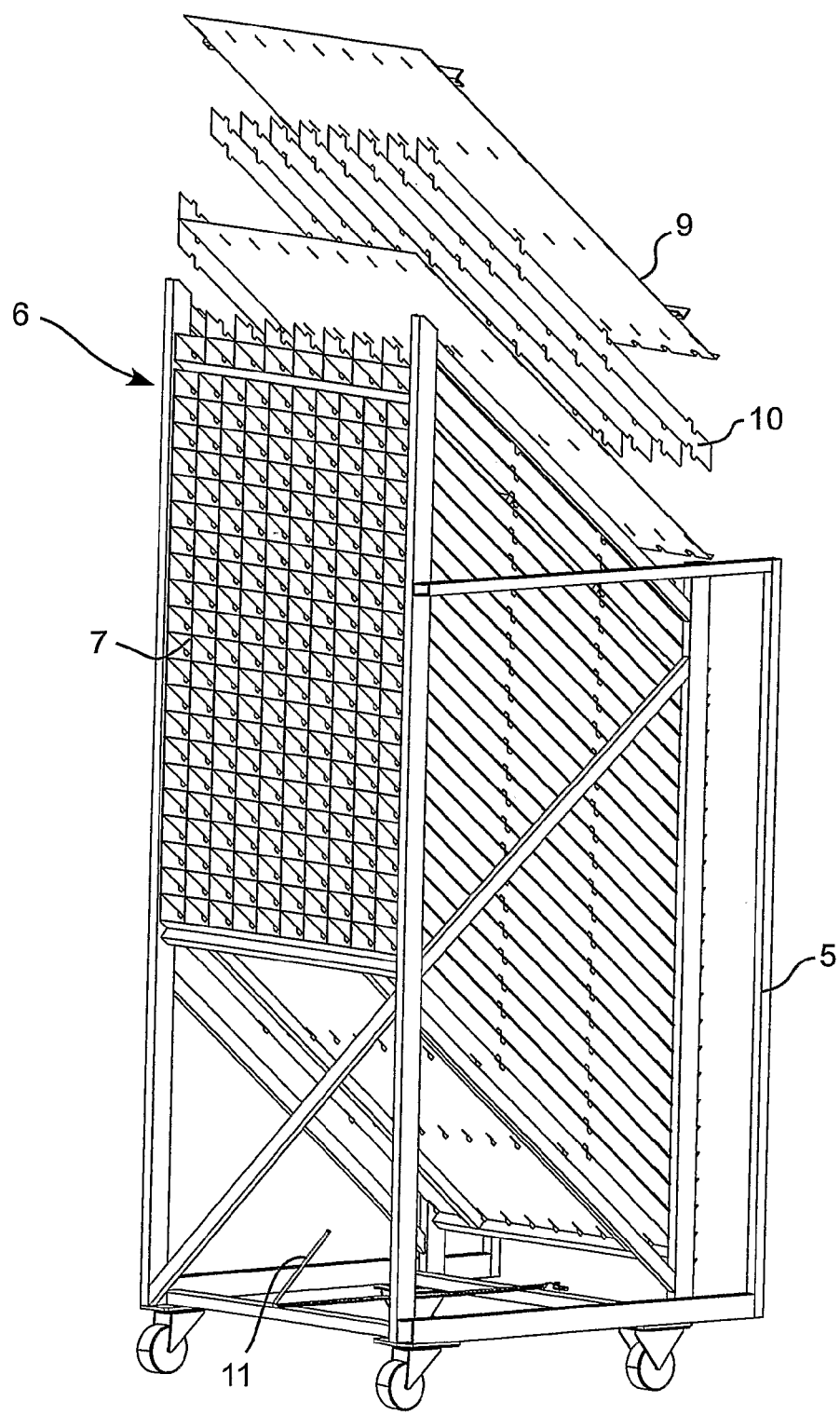
FIG. 5 shows a carriage with storage passages for being placed in the storage unit.
Figure 6:
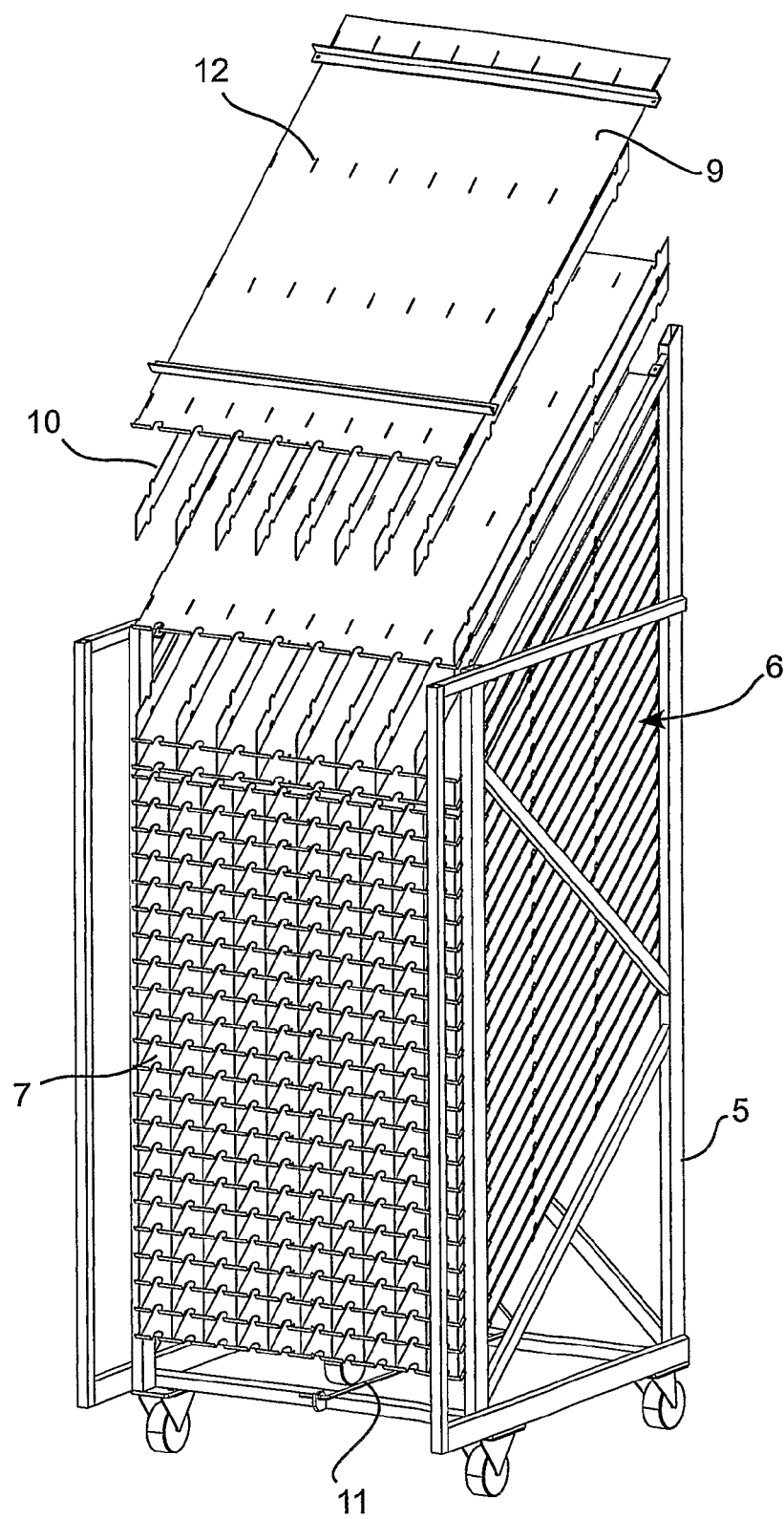
FIG. 6 shows a carriage from the side from where items or goods are discharged from the passages.
Figure 7:
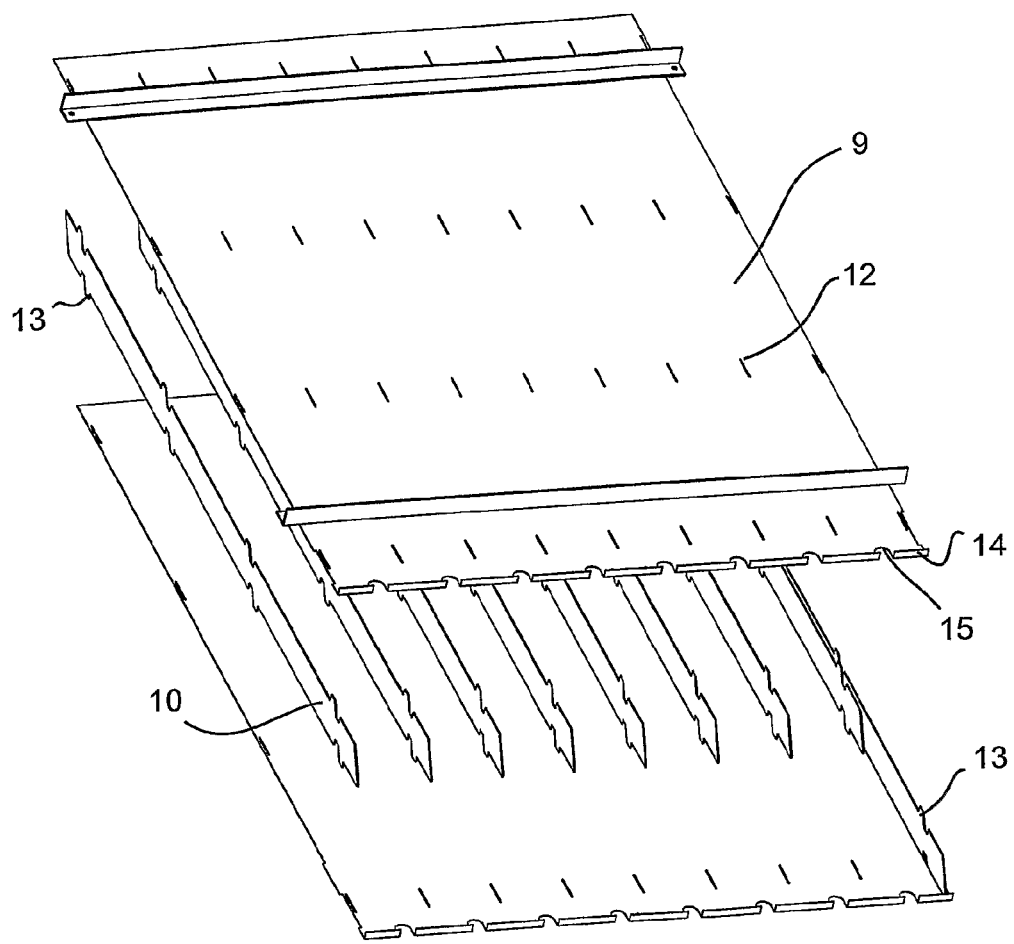
FIG. 7 shows plates and spacer elements that form storage passages in the storage unit.
Figure 8:
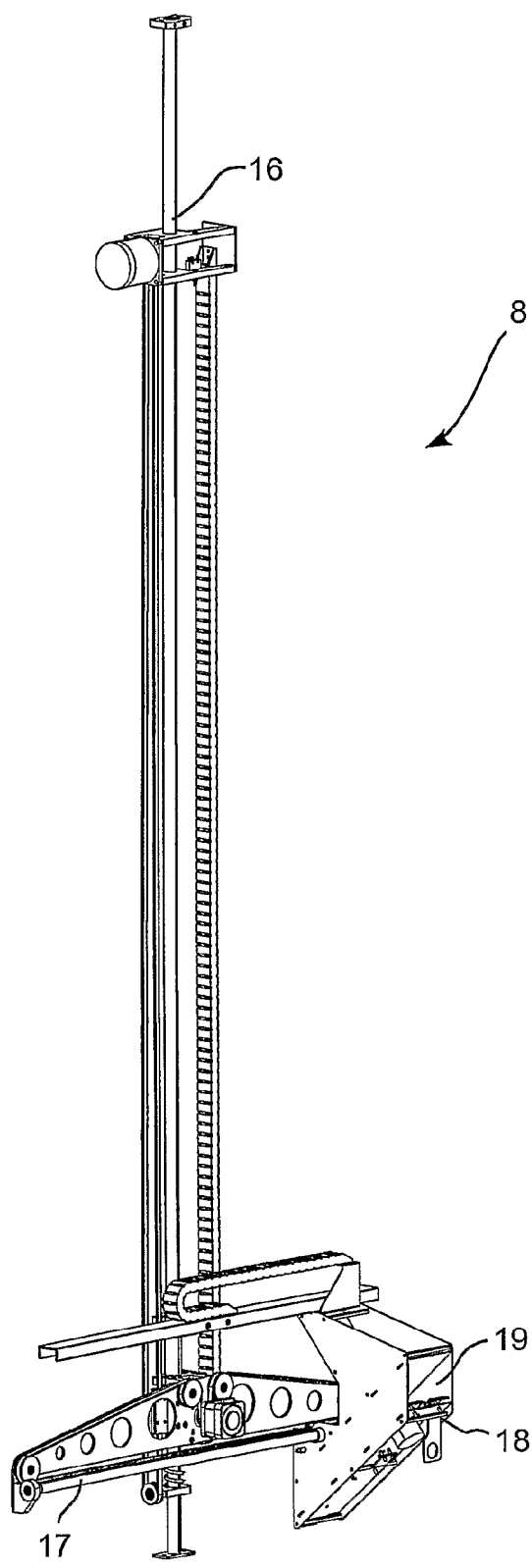
FIG. 8 shows a fetcher mechanism for fetching an item from a given passage in the storage unit.
Figure 9:
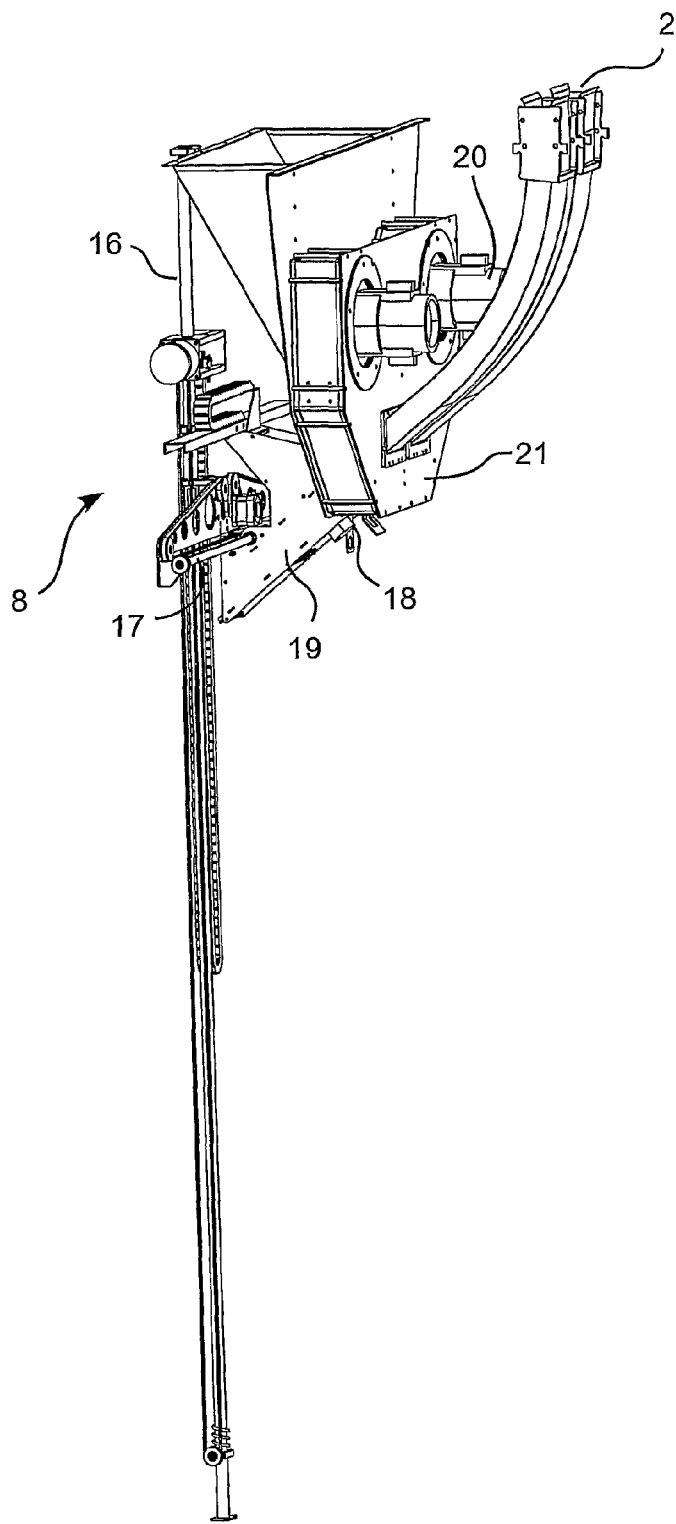
FIG. 9 shows the fetcher mechanism in a delivery situation when delivering an item to a conveyor pipe, seen diagonally from the front.
Figure 10:
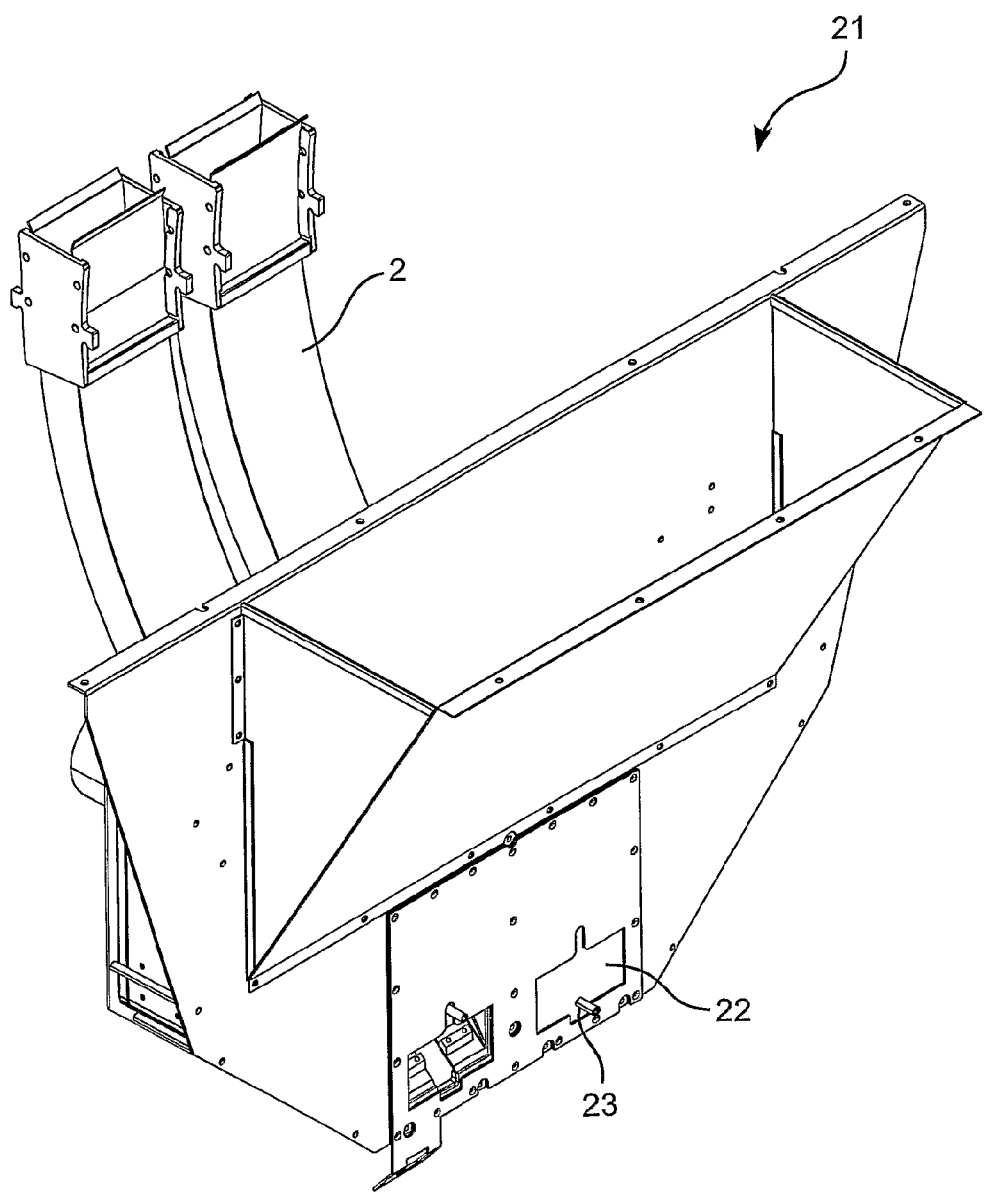
FIG. 10 shows a delivery unit.

In the following, convenient embodiments of the invention will be described, wherein a storage unit 1 is connected to one or more conveyors 2 for conveying goods, preferably cigarette packets or other goods that represent a comparatively high value and take up so little space that they can be tucked away in a pocket or the like, said storage unit 1 comprising a cabinet 3 or locker with a gate 4. When the gate 4 is opened, access is thus provided to the interior of the cabinet 3 where a carriage 5 is located. The carriage 5 can be removed from the storage unit 1 and be replaced by another carriage 5 filled with goods. It is also an option to fill the carriage 5 with goods on site.

According to a convenient embodiment the goods 9 are arranged such that they extend at an angle relative to the horizontal, which angle is different from 90° and different from 0°. Hereby it is accomplished that, in case of smaller angles between plate 9 and the horizontal, the plate 9 will take up more of the weight of a packaged item than would be the case if the angle was close to 90°. In the following packaged goods are referred to merely as goods. If the angle between plate 9 and the horizontal is close to 0°, the friction between goods and plate 9 will entail that the goods do not on their own accord slide through the passage to its stop edge 14 and therefore, in those cases, it will be necessary to provide some kind of ejector device that is to cooperate with a release means 18 that lifts the item in question across the stop edge 14.

A convenient inclination of the plates will be within the interval of 20° and 80° or alternatively 110° to 160°, depending on where the angle to the horizontal is measured.

Optionally, the plate 9 can be coated with a friction-reducing material or a number of longitudinally extending elevated portions can be provided that extend in the longitudinal direction of the passages 7, said longitudinally extending elevated portions serving as a kind of rails, and wherein the rails are made with a smooth surface.

The carriage 5 arranged in the storage unit 1 comprises a kind of storage container 6 constructed of a number of plates 9 and a number of spacer elements 10 that are combined in such a manner that they form a number of passages, storage passages 7, for accommodating the goods that are to be dispensed by sale.

The plates 9 are provided with a number of slots 12, in which slots 12 protrusions or pins 13 can be arranged that protrude from the spacer elements 10. Thereby it is possible to construct a flexible storage container 6, which storage container can be built to contain a desired number of passages 7 for receiving goods, on condition that there is space for this number of passages 7 in the unit 1. It is an option to make a larger unit wherein the passages 7 are housed, if necessary.

Plates 9 and spacer elements 10 can also be arranged in a more specific manner by the supplier of the storage container 6.

The passages 7 are formed in that a number of plates 9 are arranged essentially in parallel relative to each other, and wherein the mutual spacing between the two plates 9 is determined by one or more spacer elements 10. The spacer elements 10 are also arranged at a mutual distance across the plates 9, to the effect that the mutual distances of the spacer elements 10 determine the width of the passages 7, and the distances between the plates 9 determine the height of the passages 7. The length of passages 7 is constituted essentially of the length of the plates 9.

The widths of the plates 9 determine how many passages 7 can be situated next to each other, depending on the widths of the individual passages 7.

The dimensions of the individual passages 7 can be determined by the width of the spacer elements and by the distance between the individual spacer elements 10. Since the spacer elements 10 are arranged on and secured relative to the plate 9 by positioning a number of pins 13 that protrude from the spacer elements 10 in a number of slots 12 that are situated in a row on the plate 9, it is possible to provide each plate 9 with a number of rows of slots 12, which rows have a suitable mutual spacing that corresponds to a module of a typical width or thickness of an item. Thereby the number and dimensions of passages 7 can be adapted in accordance with the wishes of the individual shop.

The plates 9 are arranged such that the passages 7 extend at an angle to the horizontal and are dimensioned to receive goods. The angle to the horizontal is selected to be different from 90° to avoid that the lowermost item stored in a passage 7 takes up the weight from the remaining goods located in the passage 7.

Thus, due to the inclining faces 9, the goods will not influence each other with as much force as would be the case if the goods were located on top of each other in a vertical stack.

By further dimensioning the passages 7 such that the goods are caused to be situated in extension of each other to the effect that the contact between two items that rest against each other is between the narrow sides of the goods and preferably the ends of the goods, it is accomplished that the compression of an item (most comprehensive for the item situated at the bottom of the stack) is reduced considerably, while simultaneously the impact on the ends of the goods is not to the same extent able to deform the contents of the goods, which is fairly essential in case of tobacco such as cigarettes and the like.

By modifying the dimensions of plates 9 and spacer elements 10, respectively, it is possible to modify the dimensions of the passages 7 for either all the passages 7 or, by arranging eg the spacer elements 10 with differing spacings, a group of passages 7 can be obtained, where the passages 7 exhibit different cross-sections/clearances. Thereby it is possible to construct a storage container or storage for storing and dispensing goods of different dimensions in a convenient and flexible manner.

When an item is to be taken from the storage unit 1 for delivery, the conveyor of goods takes place from the storage unit 1 via conveyor pipe 2 by means of air, and the goods are taken from the central storage 1 for delivery at a check-out point when a customer or sales assistant has selected the item, eg by pressing a button.

From the storage passages 7 one or more goods are fetched in that a fetcher mechanism 8 moved in immediate vicinity of the lower end of the passages 7 or at the lowermost level of the plate 9, is positioned just outside the desired storage passage 7, wherein the fetcher mechanism 8 comprises means for determining position, to the effect that the fetcher mechanism 8 can be arranged just outside a given storage passage 7. According to a preferred embodiment the fetcher mechanism 8 is moved via a vertical 16 and a horizontal 17 guide, but other guides may of course be used. Then the desired item(s) is/are fetched from a given passage 7 by a release finger or pin 18 from the fetcher mechanism 8 via a recess or a groove 15 lifting an item across an edge 14 that forms a stop for the goods thereby preventing them from falling out when arranged in the storage passages 7. Then the item of goods is conveyed across the stop edge 14 and down into a temporary storage container or transfer chamber 19 in the fetcher mechanism 8. Of course, the height of the stop edge 14 must be taken into consideration when determining the height of the storage passage 7, said height corresponding essentially to the width of the spacer element 10. The fetcher mechanism 8 is then caused to assume a delivery position at a delivery unit 21, which delivery unit 21 comprises one or more blowers 20 and one or more conveyor pipes 2. The item is taken from the transfer chamber 19 of the fetcher mechanism 8 by means of an ejector (not shown) or the like and into a conveyor pipe 2. When the fetcher mechanism is caused to assume its delivery position, a kind of flap or gate 22 is activated and opened in the delivery unit 21 by means of a kind of pin or protrusion 23 on the gate 22 which is influenced by the fetcher mechanism 8. When the item is located in the conveyor tube 2, the gate 22 is deactivated in the delivery unit 21, whereby the gate 22 is closed.

As a further measure, a holder means may exert a slight pressure onto the item thereby preventing the item from sliding backwards if the flap is not completely closed when the fetcher mechanism 8 moves away from the delivery unit 21.

When the item is arranged in the conveyor tube 2, a flow of air is started, whereby the item is advanced through a pipe system to the check-out point that ordered the item. In order to be able to advance the item to the relevant check-out point from a number of same, the pipe system may be provided with a kind of shunting tracks that ensure that the item is conveyed in the right direction.

The fetcher mechanism 8 may comprise one or more transfer chambers 19 and one or more releasers 18 for releasing goods from the transfer passages 7.

The fetcher mechanism 8 may also comprise one or more ejectors for pushing one or more goods that have been taken into one or more transfer chambers 19 into a conveyor pipe 2.

According to a preferred embodiment, the delivery unit is connected to two conveyors, but in order to increase capacity the delivery unit may be connected to several conveyors. In other cases, it may suffice to have a single conveyor tube connected to the delivery unit.

Since the fetcher mechanism may comprise a number of transfer chambers 19, it is obvious that, in the relevant case, one or more release means 18 are provided that are able to operate, independently of each other, in each their transfer chamber 19 and thus release goods from the storage passages 7, and ejectors for pushing one or more goods that are taken into one or more transfer chambers 19 into a conveyor pipe 2.

According to a preferred embodiment of the lockable cabinet 3 of the storage unit 1, the carriage 5 comprises one or more storage containers 6 with storage passages 7, wherein the carriage 5 can be replaced by a corresponding carriage 5 with filled storage container 6.

Between the cabinet 3 and the carriage 5, an automatic cut-out 11 may be provided that cuts out all current to the storage unit when the carriage 5 leaves the cabinet 3.

Figure 11:
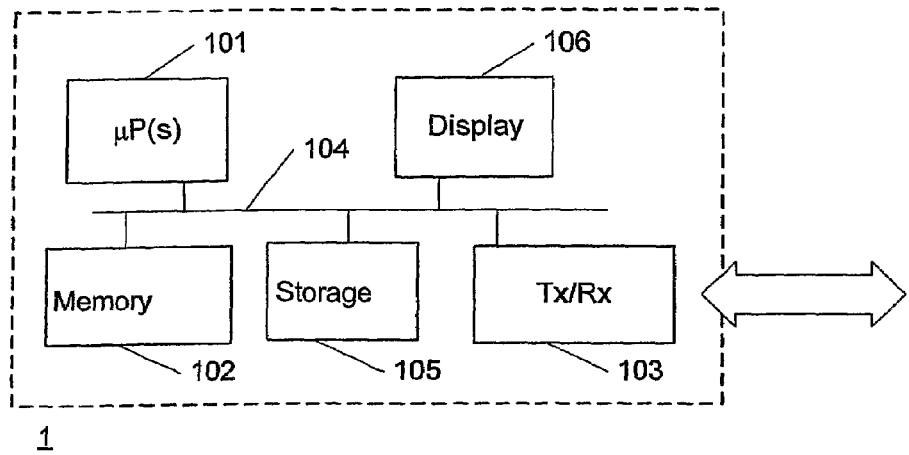
FIG. 11 shows a storage unit according to an embodiment of the invention.

FIG. 11 illustrates a storage unit according to an embodiment of the invention. Shown is a storage unit 1 for dispensing goods which corresponds to the storage unit shown and explained in the context of the previous figures. The storage unit according to this embodiment further comprises one or more calculation units 101, such as eg one or more general micro-processors and/or one or more special/dedicated processors. The calculation unit 101 is connected to a memory 102 and optionally at least one storage 105 via an internal or external data/address bus 104 or the like. The storage unit 1 further comprises a communication unit 104 configured for wireless and/or wired communication of data with one or more other apparatuses or systems via one or more networks (not shown).

Preferably the storage unit 1 is capable of exchanging data with one or more local external units (not shown; see FIG. 13) such as eg check-out or payment apparatuses, (customer) operating units or panels, etc. Preferably, the storage unit 1 may also exchange data with a central, remotely located unit (not shown; see FIG. 13), such as eg a central server. The exchanged data may eg comprise data representing a current stockpile, request for or order for new goods, need for replenishment, a log of sold-out goods, sales data, sales reports, return control (eg return of wrongly selected and/or damaged goods), etc. A central server may optionally communicate with a vast number of delivery apparatuses, eg in a number of different shops or outlets and collect data from all of them. Data may be stored eg on the central server in an SQL database or the like, optionally coupled to a web interface that gives access to data, reports based on the stored data, etc.

Optionally the storage unit 1 may also comprise or be connected to a display or screen unit 106 for displaying data, information, user interface, etc., and input means (not shown) for recording data, selection from a user, etc., as is known from earlier prior art.

The memory 102 and/or the storage 105 is used for storing and retrieving relevant data, one or more databases and executable computer code for providing the functionality according to the invention by executing the calculation unit 101 as described in further detail in the following. The functionality may be located completely or partially in the storage unit 1 and/or completely or partially in a connected external data processing unit, such as eg a PC. The executable code may be implemented in any language which is able to provide the described functionality.

The storage 105 may comprise one or more storage units capable of reading and optionally writing blocks of data, such as eg a DVD, DVD-RAM, CD, CD-RW, an optical disc, a hard disk (IDE, E-IDE, ATA, SATA, etc), floppy disc, smart card, PCMCIA card or the like. The storage 105 may also comprise a network drive. The memory may be any kind of volatile (RAM, etc.) and/or non-volatile (ROM, etc.) memory.

Figure 12:
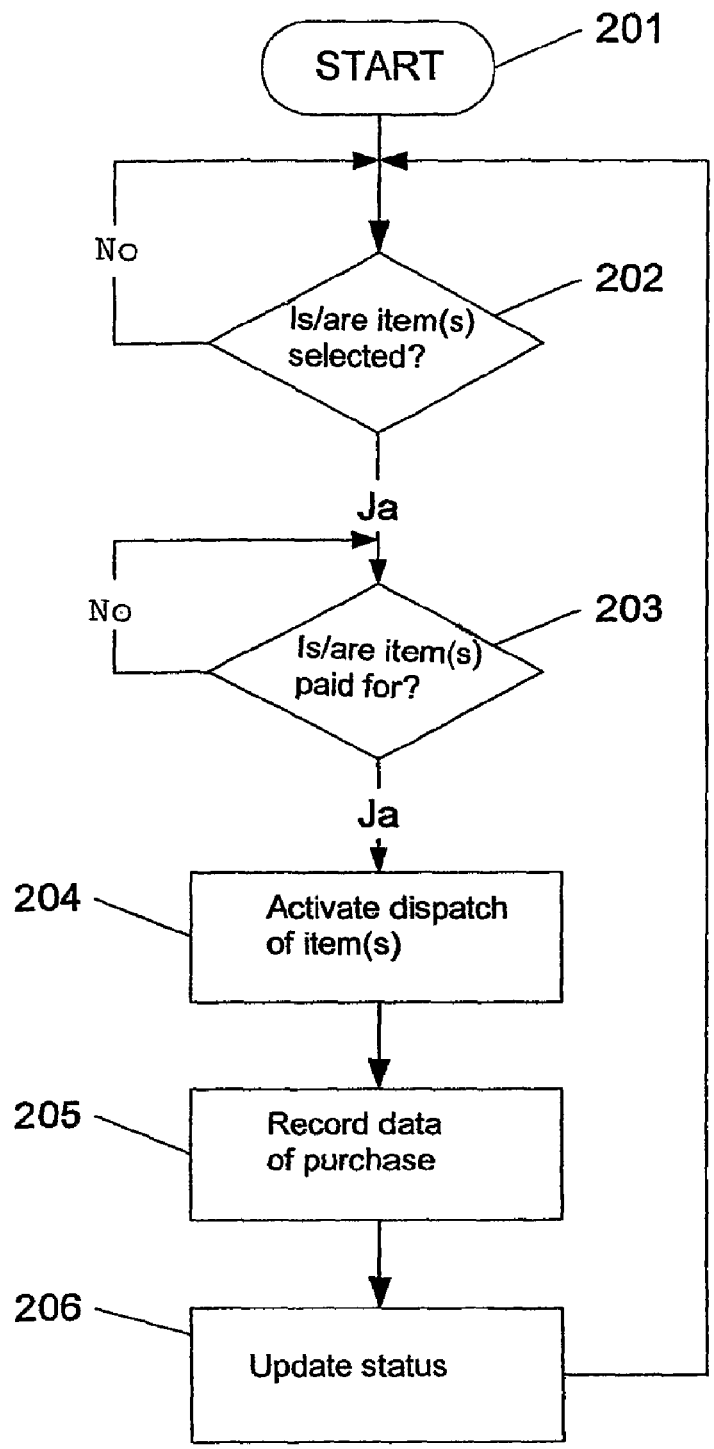
FIG. 12 is a flow chart illustrating an embodiment according to the invention of a method for the storage unit shown in FIG. 11.

FIG. 12 shows a flow-chart illustrating an embodiment according to the invention of a method of the storage unit shown in FIG. 11.

A method is shown, starting in step 201, wherein miscellaneous initialisations, such as start up/status check of the storage unit, reading of relevant data and/or one or more databases and establishment of relevant communication protocols and communication connections and the like initialising operations are executed.

In step 202 it is checked whether one or more goods have been selected for delivery. If that is not the case, the check in step 202 is performed again, until one or more goods have been selected. Alternatively step 202 waits until at least one item has been selected by a potential buyer. If one or more goods have been selected, the process proceeds to step 203. Selection of the item or the goods can be accomplished eg by means of an operating panel (not shown; see FIG. 13) in the purchasing area which is operated directly by the buyer. In response to the current selection, data representing an item or product code or ID for each type of goods and a number for each item will be dispatched and received in the storage unit. It is preferably checked whether the selected item or goods are in stock in the storage unit. If the item is not in stock, information to that effect can be transmitted to a relevant payment unit and/or the relevant operating panel (not shown; see FIG. 13), where the buyer is consequently able to make another choice or abort the purchase.

In step 203 it is checked whether the selected item or goods are recorded as paid for. The recording of payment may take place eg by receipt of data from a payment unit (not shown; see FIG. 13), indicating that payment of the relevant goods has taken place.

The check in step 203 is performed until suitable payment has been recorded (or until the purchase is aborted, following which the method leaps back to before step 202 and awaits renewed selection of an item). Following recording of suitable payment, the method proceeds to step 204.

According to an alternative embodiment is in not necessary to pay the item before it is delivered, whereby the check in step 203 is not performed. In this embodiment it is merely ensured that the selected item or goods is/are recorded (eg by relevant shop assistant ID as described below), before the item is dispatched in step 204. This is useful eg in a system where the check-out function is unable to exchange data on purchase with the storage unit, or where it is preferred that the item is dispatched to a point near the buyer (eg near the operating panel where the item was selected) for subsequent payment.

According to a preferred embodiment an ID or code is further recorded and saved (that can be linked to the relevant purchase and/or item recording) for the relevant sales assistant who has recorded the transaction and optionally received payment, and a time and date stamp of the payment. This makes it easy to check whether any loss of goods occurs. In particular in view of the fact that the goods are in a closed system and are not available until after recording of the item and/or recording that payment has taken place. In this manner no item can be dispensed from the unit without recording of the item as such and/or payment has taken place. The sales on a cash register receipt or sales report (either electronically or physically) can then be compared to dispensed goods for a given period. Recording of ID for a sales person may take place eg by an electronic badge or the like being taken close to a ready or by a unique key being used, wherein a specific key is associated with a specific sales assistant (at least for a given period of time).

Alternatively the checks performed in steps 202 and 203 can be combined to one single check, to the effect that the methods checks or waits until one or more goods have been selected and registered as paid (or merely registered).

In step 204, dispensing the item or goods purchased or paid for is activated. Preferably this takes place by dispatching the goods in question from the storage container in the storage unit to the relevant transfer pipe, following which the goods are conveyed to a point close to the relevant selling point or dispensing point, such as eg the relevant payment unit or operating panel. From the storage passages in the storage unit, one or more goods are fetched as described above. A fetcher mechanism comprises means for determining position to the effect that the fetcher mechanism 8 can be caused to be situated just outside a given storage passage. Preferably data are stored, eg in the form of a product code or ID for each storage passage that indicates the item situated on the current storage passage. This can be used to advantage for causing the fetcher mechanism to take goods to a relevant storage passage in response to the selected item or goods.

Preferably the storage unit will receive data that uniquely identify the relevant selling point or dispensing point. Further data on the relevant distance between the storage unit and the destination through the conveyor pipe can be stored eg in the storage unit and can be used to determine for how long the conveyor mechanism (eg a pump) has to be active, if necessary.

Then the method proceeds to step 205, wherein data (such as item ID and number of the sold goods, ID for the sales assistant, ID for the used payment unit and/or the used customer operating panel, etc) for the transactions just performed are recorded and stored unless recorded during the process. Moreover a unique ID number for each order or transaction is preferably recorded and stored. This may be provided eg by each dispensing unit having a unique ID code and it being combined with a serial number that is counted for each event.

In step 206, status is updated, such as eg stock position, for the sold goods, unless it was recorded during the process. If an item is sold out as a consequence of the purchase, information can be transmitted to the relevant payment unit and/or the relevant operating panel which may then indicate eg that the given item is temporarily sold out, and optionally block further selection of the item in question until the item is again available in the storage unit.

According to one embodiment, the stored data and selling position, storage position, etc., are transferred to a central server, either in accordance with a fixed time pattern or on request (either local or central).

In the first instance, return goods (eg due to dispensed damaged goods, regretted purchase, wrong selection, wrong replenishment of storage unit; etc.) may be collected by the sales assistant. If the item has been paid for, it can be withdrawn from the check-out point again. The return item is then put in eg a return bag or the like associated with the sales person or the check-out line, and ID for sales assistant and/or ID for check-out point and/or payment unit and/or operating unit (see eg FIG. 13) is recorded or noted. Then the sales assistant obtains an acceptance/receipt from a trusted employee or the like in respect of the return item. It can then optionally (if it is not damaged) be reintroduced into the storage unit.

Figure 13:
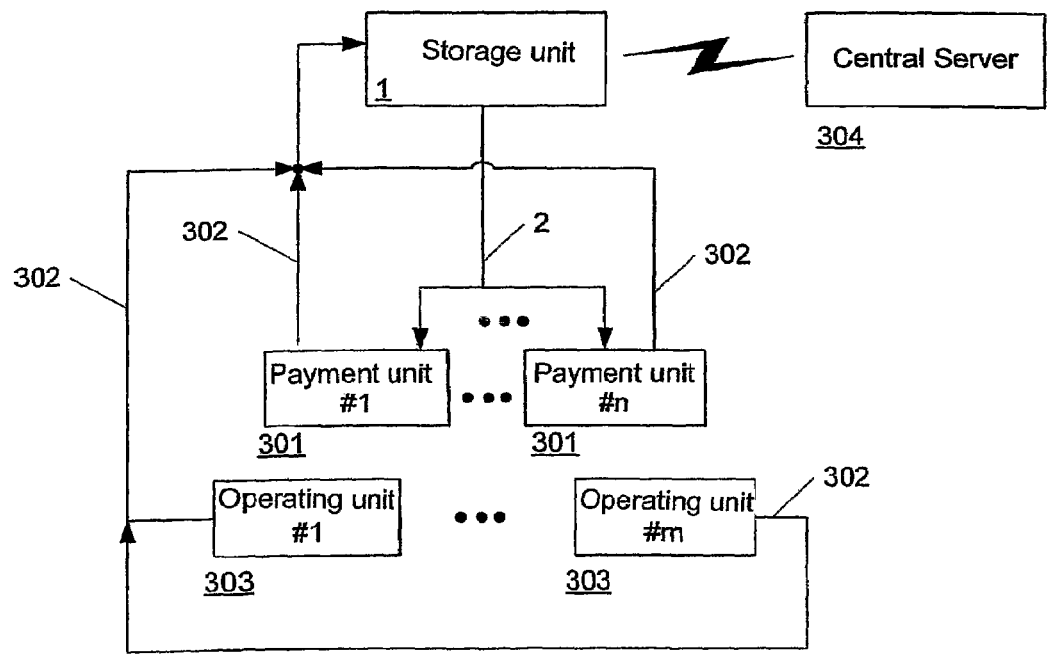
FIG. 13 shows a system according to an embodiment of the invention.

FIG. 13 illustrates a system according to an embodiment of the invention. Shown is a dispensing apparatus 1 as described above. The storage unit 1 operates as described ia in the context of FIG. 12 and receives data from at least one check-out point and/or payment unit 301 and/or at least one operating unit 303 via a wireless and/or wired communications dine 302. When the conditions for dispensing an item are complied with (ie recording and/or payment), the selected (and optionally paid) item or goods are dispensed via a conveyor mechanism 2 such as eg a conveyor pipe by use of air pressure or other conveyance mechanisms.

The storage unit 1 may also communicate with one or more central units 304 for central data collection, etc. as described above. Each check-out point or payment unit 301 may have a unique ID number known by the storage unit 1. Moreover, each customer operating unit 302 may also have a unique ID number. This makes it easier to determine where a given item is to be dispatched to for delivery. Preferably, a sales assistant ID is also logged for each check-out point or payment unit 301 to the effect that waste, if any, can more easily be investigated.

In such system, a higher degree of security is provided since the goods are accommodated in a locked area and are handed out following recording and/or recorded payment only. Other access to the goods (eg for the purpose of replenishment) is preferably to take place by use of a key or a code which is available to trusted staff only. Besides, the risk of waste is reduced or eliminated.

The invention claimed is:

1. A dispenser apparatus for goods, said apparatus comprising:
a storage unit for storing goods in a number of storage passages, said storage passages forming an angle to the horizontal which is larger than or smaller than 90°,
a fetching unit for moving one or more goods from the storage unit to a conveyor unit, said conveyor unit conveying, via an air pressure, goods to a dispensing station, wherein the fetching unit in the form of a fetcher mechanism comprises:
one or more transfer chambers; and
one or more ejectors for pushing one or more goods conveyed in said one or more transfer chambers into a conveyor pipe of the conveyor unit; and
wherein the fetching unit and one or more transfer chambers are moveable vertically and horizontally to fetch goods from the storage passages and to a delivery position for delivering the goods directly to the conveyor pipe of the conveyor unit,
wherein the one or more ejectors push the goods directly from the fetching unit in to the conveyor pipe of the conveyor unit.

2. An apparatus according to claim 1, wherein the storage passages are formed by essentially parallel plates with a number of slots provided in rows, said plates being connected to each other by a number of spacer elements, on which spacer elements a number of pins are intended for engaging with a part of the slots formed in the plate.

3. An apparatus according to claim 1, wherein, at the end which is located in the lowermost level, the plates are provided with a stop edge.

4. An apparatus according to claim 3, wherein, in the stop edge, one or more release grooves are provided that cooperate with a releaser to cause an item to travel across the stop edge when the item is to be advanced further in the apparatus.

5. An apparatus according to claim 1 wherein a fetcher mechanism is provided in connection with the storage unit, which fetcher mechanism comprises means for determining position, whereby the fetcher mechanism can be caused to be situated just outside a given storage passage.

6. An apparatus according to claim 5, wherein the fetcher mechanism comprises one or more transfer chambers and respective releasers associated with each transfer chamber.

7. An apparatus according to claim 5, wherein the fetcher mechanism comprises one or more transfer chambers and respective ejectors associated with each transfer chamber.

8. An apparatus according to claim 1 wherein, in a delivery unit, in connection with the transport pipe, a flap or gate is provided that, by means of a pin or a protrusion and upon influence from the fetcher mechanism, opens for access to the conveyor pipe when the fetcher mechanism is in a delivery position just outside the conveyor pipe and closes again when the fetcher mechanism has delivered the transferred item.

9. An apparatus according to claim 1 wherein the storage unit comprises a lockable cabinet, in which cabinet a carriage can be arranged, which carriage comprises one or more storage containers with storage passages; and that the carriage can be replaced by a corresponding carriage with replenished storage container.

10. An apparatus according to claim 9, wherein, between the cabinet and the carriage, an automatic cut-out may be provided that cuts out all current to the storage unit when the carriage leaves the cabinet.

11. An apparatus according to claim 1 wherein the apparatus further comprises
   a calculator unit for processing digital data;
   a storage and/or a memory for storing digital data representing an identification of at least one item;
   a communications unit configured for communicating with one or more external units via a network; wherein the calculation unit is configured for receiving and storing data representing selection of at least one item; and wherein the dispenser apparatus for goods is configured for dispensing said at least one item if said at least one item is in stock in said dispenser apparatus and if said dispenser apparatus has received data representing a recording of said at least one item and/or recording of a payment made in respect of said at least one item.

12. An apparatus according to claim 11, wherein the apparatus is configured for communicating with one or more of:
   at least one payment or check-out unit;
   at least one central server; and
   at least one operating unit.

13. An apparatus according to claim 1 wherein the apparatus comprises restricted access to goods apart from said dispensing of an item following recording of said at least one item and/or registration of a payment made.

14. A method of dispensing goods, wherein the method comprises
   receipt of data representing selection of at least one item; and
   dispensing from a dispenser apparatus of said at least one item, if said at least one item is in stock in said apparatus for dispensing, and if said dispenser apparatus has received data representing at least one of a recording of said at least one item and recording of a payment made in respect of said at least one item, wherein the dispenser apparatus comprises:
   a storage unit for storing goods in a number of storage passages, said storage passages forming an angle to the horizontal which is larger than or smaller than 90°,
   a fetching unit for moving one or more goods from the storage unit to a conveyor unit, said conveyor unit conveying, via an air pressure, goods to a dispensing station,
   wherein the fetching unit in the form of a fetcher mechanism comprises:
      one or more transfer chambers; and
      one or more ejectors for pushing one or more goods conveyed into one or more transfer chambers into a conveyor pipe of the conveyor unit; and
   wherein the fetching unit and one or more transfer chambers are moveable vertically and horizontally to fetch goods from the storage passages and to a delivery position for delivering the goods directly to the conveyor pipe of the conveyor unit,
   wherein the one or more ejectors push the goods directly from the fetching unit into the conveyor pipe of the conveyor unit.

15. A system for dispensing goods, wherein the system comprises:
   a dispenser apparatus comprising:
      a storage unit for storing goods in a number of storage passages, said storage passages forming an angle to the horizontal which is larger than or smaller than 90°,
      a fetching unit for moving one or more goods from the storage unit to a conveyor unit, said conveyor unit conveying, via an air pressure, goods to a dispensing station,
      wherein the fetching unit in the form of a fetcher mechanism comprises:
         one or more transfer chambers; and
         one or more ejectors for pushing one or more goods conveyed into one or more transfer chambers into a conveyor pipe of the conveyor unit; and
      wherein the fetching unit and one or more transfer chambers are moveable vertically and horizontally to fetch goods from the storage passages and to a delivery position for delivering the goods directly to the conveyor pipe of the conveyor unit;
      wherein the one or more ejectors push the goods directly from the fetching unit into the conveyor pipe of the conveyor unit; and
   at least one payment unit, wherein said dispenser apparatus and said at least one payment unit are connected for exchanging data representing selection of at least one item and data representing at least one of a recording of said at least one item and registration of a payment made in respect of said at least one item.

16. A dispenser apparatus for goods, said apparatus comprising:
   a storage unit for storing goods in a number of storage passages, said storage passages forming an angle to the horizontal which is larger than or smaller than 90°,
   a unit for conveying one or more goods from the storage unit to a conveyor unit, said conveyor unit conveying, via an air pressure, goods to a dispensing station,
   wherein the unit in the form of a fetcher mechanism comprises:
      one or more ejectors for pushing one or more goods conveyed into one or more transfer chambers into a conveyor pipe; and
   wherein, in a delivery unit, in connection with the transport pipe, a flap or gate is provided that, by means of a pin or a protrusion and upon influence from the fetcher mechanism, opens for access to the conveyor pipe when the fetcher mechanism is in a delivery position just outside the conveyor pipe and closes again when the fetcher mechanism has delivered the transferred item.

* * * * *

UNITED STATES PATENT AND TRADEMARK OFFICE
CERTIFICATE OF CORRECTION

| | | |
|---|---|---|
| PATENT NO. | : 8,397,947 B2 | Page 1 of 1 |
| APPLICATION NO. | : 12/279711 | |
| DATED | : March 19, 2013 | |
| INVENTOR(S) | : Nielsen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 734 days.

Signed and Sealed this
Fourth Day of March, 2014

Michelle K. Lee
*Deputy Director of the United States Patent and Trademark Office*